United States Patent
Klein (10) Patent No.: US 9,472,937 B2
(45) Date of Patent: Oct. 18, 2016

(54) CABLE/CABLE TRAY MOUNT

(75) Inventor: David L. Klein, Shaker Heights, OH (US)

(73) Assignee: Metal & Cable Corp., Inc., Twinsburg, OH (US)

( * ) Notice: Subject to any disclaimer, the term of this patent is extended or adjusted under 35 U.S.C. 154(b) by 0 days.

(21) Appl. No.: 13/219,066

(22) Filed: Aug. 26, 2011

(65) Prior Publication Data
US 2012/0049013 A1    Mar. 1, 2012

Related U.S. Application Data

(60) Provisional application No. 61/377,770, filed on Aug. 27, 2010.

(51) Int. Cl.
| A47G 1/17 | (2006.01) |
| H02G 3/32 | (2006.01) |
| H01F 7/02 | (2006.01) |

(52) U.S. Cl.
CPC .............. *H02G 3/32* (2013.01); *H01F 7/0221* (2013.01)

(58) Field of Classification Search
CPC ................................ H02G 3/32; H01F 7/0221
USPC ................................. 248/683, 206.5, 74, 158
See application file for complete search history.

(56) References Cited

U.S. PATENT DOCUMENTS

| 1,319,481 A | 10/1919 | Mahon |
| 1,778,481 A | 10/1930 | Boucher |
| 3,082,982 A | 3/1963 | Moskowitz |
| 4,543,584 A | 9/1985 | Leer |
| 4,793,275 A * | 12/1988 | Usher .................... B63C 7/006 114/382 |
| 4,907,769 A * | 3/1990 | Hunley, Jr. ............. F21V 21/06 248/122.1 |
| 5,376,722 A | 12/1994 | Coolbaugh et al. |
| 5,979,844 A | 11/1999 | Hopkins |
| 6,267,341 B1 * | 7/2001 | Fleming et al. ........... 248/309.4 |
| 6,855,890 B1 * | 2/2005 | Vasichek .................. H02G 3/30 174/135 |
| 7,624,957 B2 | 12/2009 | Klein |
| 7,931,242 B2 * | 4/2011 | Tjerrild ........................ 248/58 |
| 2006/0027719 A1 * | 2/2006 | Klein ............................ 248/158 |
| 2007/0144376 A1 * | 6/2007 | Jostmeier ............. H02G 11/006 101/350.1 |
| 2008/0054136 A1 | 3/2008 | Gou |
| 2011/0011989 A1 * | 1/2011 | Samolej .................. F16L 3/085 248/74.3 |
| 2011/0304519 A1 * | 12/2011 | Klein ........................... 343/890 |

FOREIGN PATENT DOCUMENTS

| DE | 19903819 | 8/2000 |
| WO | WO 03/047829 | 6/2003 |

* cited by examiner

*Primary Examiner* — Amy Sterling
(74) *Attorney, Agent, or Firm* — Fay Sharpe LLP (57) ABSTRACT

A cable/cable tray mounting system comprises a plurality of magnets and a strut. The strut includes a plurality of spaced apart mounting apertures. A suspension assembly pivotally secures each magnet of the plurality of magnets to the strut. The plurality of mounting apertures of the strut allow for varying magnetic arrangements of the plurality of magnets thereby allowing the magnet mounting system to be mounted onto flat surfaces, curved surfaces and/or other shaped surfaces.

21 Claims, 6 Drawing Sheets

CABLE/CABLE TRAY MOUNT

RELATED APPLICATIONS

This application claims the benefit of and priority to prior U.S. provisional application Ser. No. 61/377,770, filed Aug. 27, 2010, the disclosure of which is incorporated herein in its entirety by reference hereto.

BACKGROUND OF THE INVENTION

The present disclosure relates to mounting systems and, more particularly, to cable/cable tray mounting assemblies. It finds particular application in conjunction with the mounting of cables, cable trays, and various types of support arrangements to various types of structures/surfaces, and will be described with particular reference thereto. However, it is to be appreciated that the present disclosure is also amenable to other like applications.

In this regard, cable and cable tray mounting assemblies are well known and readily utilized for mounting power cables, communication cables, signal cables and the like on various surfaces. Many of these mounting systems include a cable or cable tray rigidly secured to a base by bolts, welding, and the like for mounting to a surface. These known mounts are designed for generally flat surfaces.

Due to the growth of wireless communication, wireless communication providers are seeking alternatives to land based antenna towers. As such, wireless communication providers have begun mounting wireless communication antennas and associated electronic equipment to existing structures, such as a building's HVAC unit/duct work and water towers. Problems arise when conventional cable or cable tray mounting systems are considered for fastening or supporting the cables to these existing structures. Particularly, most conventional cable or cable tray mounting systems require the cable or cable tray to be welded or bolted to the existing structure. However, this approach on HVAC units/duct work or water towers is undesirable due to health and environmental concerns. For example, the EPA and other government authorities require a permit and supervision during installation of conventional mounting structures to water towers due to these concerns thus increasing the cost and time associated with such an installation. In addition, conventional magnetic mounting systems are unable to securely fasten or support the cables because the magnets of the conventional magnetic mounting systems are generally rigidly secured to the base. Thus, only a small portion of each magnet's potential holding power is utilized when mounting onto a convex surface such as a water tower. One who has experimented with conventional cable tray mounting systems will be aware of still further deficiencies and difficulties that one must confront in utilizing such devices.

In light of the foregoing, it becomes evident that there is a need for a cable/cable tray mounting assembly to provide a solution to one or more of the deficiencies from which the prior art and/or cable/cable tray mounting assemblies has suffered. It is still more clear that a cable/cable tray mounting assembly providing a solution to needs left unresolved by the prior art while providing a number of unrealized advantages would represent an advance in the art. Accordingly, it would be desirable to develop a cable/cable tray mounting assembly which could be secured to a convex surface.

BRIEF DESCRIPTION

In accordance with one aspect of the present disclosure, a magnetic mounting system is provided. The magnetic mounting system comprises a strut and a first magnet suspended from the strut for mounting the strut onto a surface.

In accordance with another aspect of the present disclosure, a magnetic mounting system comprises a plurality of magnets and a strut. The strut includes a plurality of spaced apart mounting apertures. A suspension assembly pivotally secures each magnet of the plurality of magnets to the strut. The plurality of mounting apertures of the strut allow for varying magnetic arrangements of the plurality of magnets thereby allowing the magnet mounting system to be mounted onto a convex surface.

In accordance with yet another aspect of the present disclosure, a magnetic mounting system for a cable tray or cable clamp comprises a strut and at least one magnet pivotally secured to the strut. The at least one magnet is adapted to at least partially mount the strut to a surface.

Still other aspects of the invention will become apparent from a reading and understanding of the detailed description of the several embodiments hereinbelow.

BRIEF DESCRIPTION OF THE DRAWINGS

The present disclosure may take physical form in certain parts and arrangements of parts, several embodiments of which will be described in detail in this specification and illustrated in the accompanying drawings which form a part of the disclosure.

DETAILED DESCRIPTION

Figure 1:
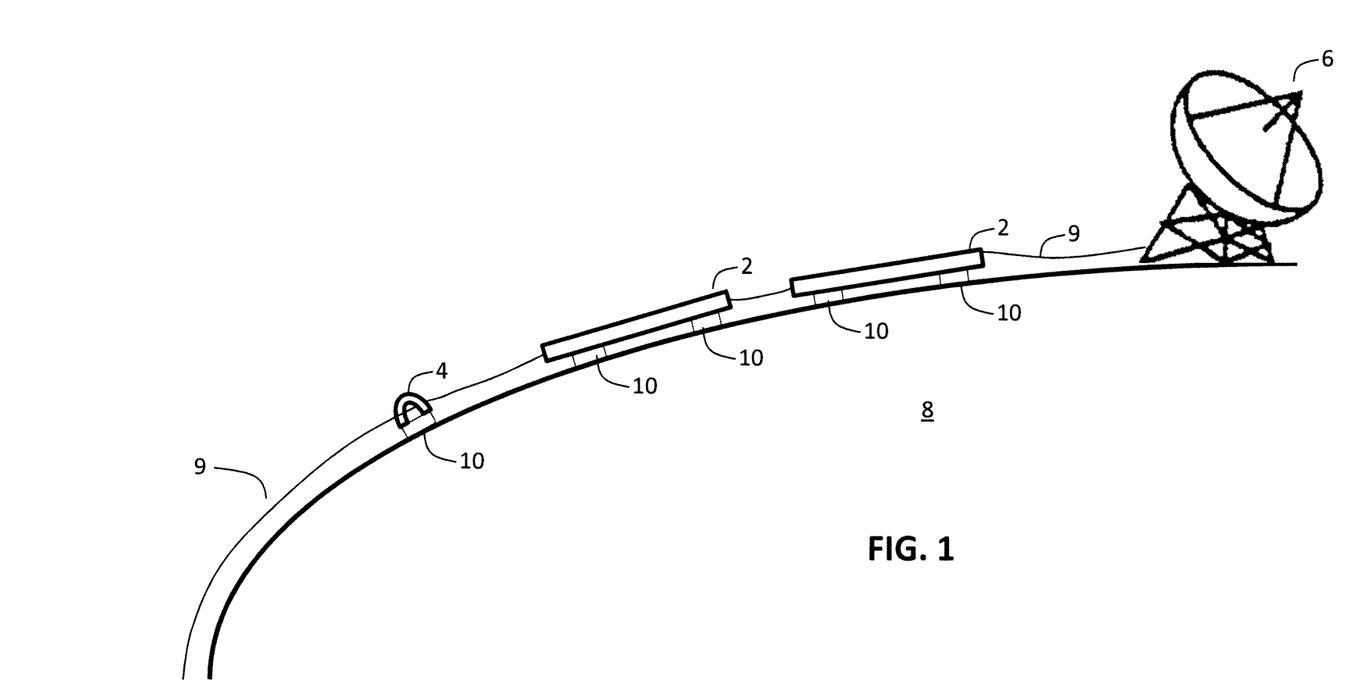
FIG. 1 is an illustration of an example implementation of a magnetic mounting system in accordance with an embodiment of the present disclosure.

With reference to FIG. 1, in one example implementation, magnetic mounting systems 10 are illustrated to mount a cable tray 2 or cable clamp 4 to flat surfaces, curved surfaces and/or other shaped or irregular surfaces. In this example, a wireless communication antenna 6 and associated electronic equipment is mounted to an existing structure 8, such as a water tower, HVAC unit/duct work, or the like. Cables 9 such as electric power cables, communications cables, computer cables, signal cables, and the like, associated with the wireless communication antenna 6 and associated electronic equipment, are securely fastened or supported by the cable tray 2 or cable clamp 4 as they pass along the existing structure 8. In order to securely fasten or support the cables 9 as they pass along the existing structure 8, the cable trays 2 and cable clamp 4 are attached to the magnetic mounting systems 10. The orientation and configuration (described herein) of the magnetic mounting systems 10 allows such systems 10 to be securely mounted onto the curved or shaped surface of the existing structure 8. Of course, it should be appreciated that any number of magnetic mounting systems could be utilized without departing from the scope and intent of the present disclosure.

Figure 2:
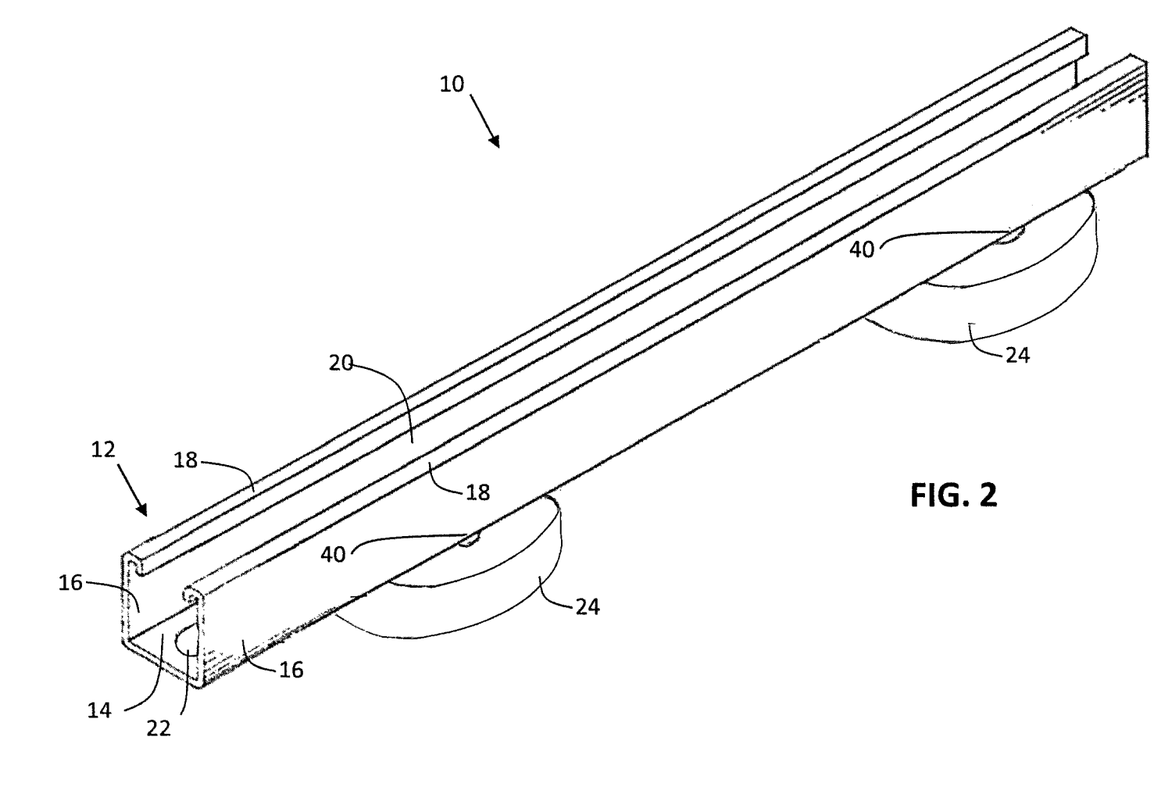
FIG. 2 is a front perspective view illustrating the magnetic mounting system in accordance with an embodiment of the present disclosure.

FIG. 2 illustrates a magnetic mounting system 10 which is designed to mount various types of structures onto flat surfaces, curved surfaces and/or other shaped surfaces. The magnetic mounting system 10 generally comprises a support, such as a strut 12. The strut 12 may take a variety of forms. However, as shown, it includes a base 14 connecting two sides 16 having rolled edges 18. The base 14 and sides 16 of the strut 12 define an elongated recess or channel 20. The base 14 further comprises a plurality of spaced apart mounting apertures 22, so that one or more components can be attached thereto. It will be appreciated that the number and the spacing of the mounting apertures may vary. It will also be appreciated that the strut may not include any apertures and the one or more components may be attached through a variety of other configurations and arrangements.

The magnetic mounting system 10 further includes at least one magnet 24 suspended from the base 14 for mounting the strut 12 to a surface. Any number of magnet 24 could be suspended from the strut 12. In this embodiment, a plurality of magnets 24 (e.g. two (2)) is suspended from the base 14. The magnets 24 are generally circular in cross-section; however, it will be appreciated that many other shapes may be used without departing from the scope and intent of the present disclosure. It will also be appreciated that many types of materials can be used to form the magnets 24. Likewise, it will also be understood that many color arrangements can be used for the magnets to obtain a desired look and function of the magnetic mounting system 10 for a particular application.

Figure 3:
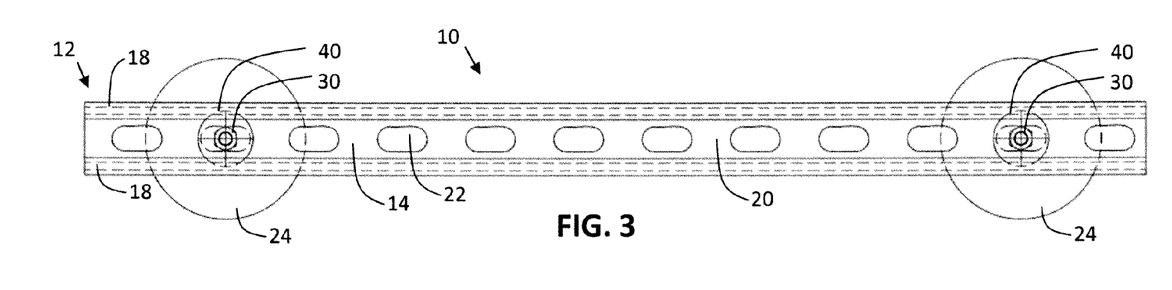
FIG. 3 is a top plain view of the magnetic mounting system of FIG. 2 in accordance with an embodiment of the present disclosure.

With reference to FIG. 3, the base 14 of the strut 12 includes the plurality of spaced apart mounting apertures 22, so that one or more components can be attached thereto. The mounting apertures 22 are adapted to receive a portion of a suspension assembly 40 (FIGS. 4-7). The mounting apertures 22 provide a plurality of mounting arrangements for the suspension assemblies 40 and magnets 24. It will be appreciated that the number of magnets and their secured arrangements to the base 14 of the strut 12 may have various configurations and will be dependent upon a particular application for the magnetic mounting system 10. In one form, the mounting apertures 22 are adapted to receive fasteners 30 for securing the base 14 of the strut 12 to the suspension assembly 40.

As set forth above, because many of the mounting locations for the magnetic mounting system 10 could have a curved, e.g. a convex or irregular surface (e.g. water towers), the plurality of magnets 24 are moveable relative to the base 14 of the strut 12. Again, if the magnets were held inflexibly to the base, only a small portion of the magnet's potential holding power would be utilized. Therefore, as will be detailed below, the suspension assembly 40 moveably secures each magnet 24 of the plurality of magnets 24 to the base 14 of the strut 12 allowing each magnet to seat itself to whatever orientation it encounters.

Figure 4:
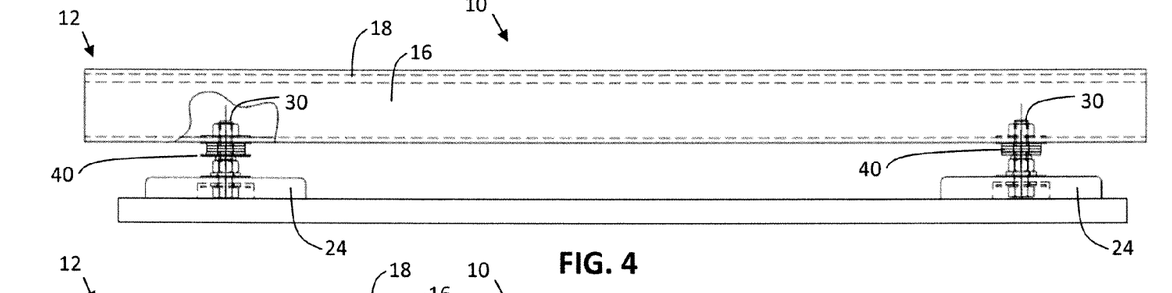
FIGS. 4 and 5 are side elevation views of the magnetic mounting system of FIG. 2 in accordance with an embodiment of the present disclosure.
Figure 5:
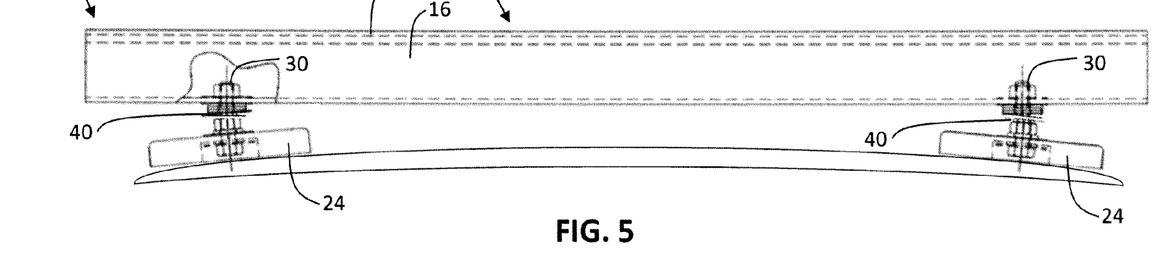

With reference to FIGS. 4 and 5, the suspension assembly 40 is secured to the base 14 of the strut 12. The suspension assembly 40 provides for some movement of the magnet 24 relative to the base 14 to facilitate in the connection of the magnet 24 to a variety of surfaces. FIG. 4 illustrates the suspension assembly 40 having orientation and configuration such that the magnets 24 are in an arrangement allowing the magnetic mounting system 10 to be mounted onto a flat surface. FIG. 5 illustrates the suspension assembly 40 having orientation and configuration such that the magnets 24 are in an arrangement allowing the magnetic mounting system 10 to be mounted onto a curved or shaped surface. It will be appreciated that the number of magnets and their configurations to the base 14 of the strut 12 will be dependent upon a particular application for the magnetic mounting system 10 and the type of surface onto which the magnetic mounting system 10 is to be mounted. It will also be appreciated that the shown curved or shaped surface could take a variety of forms including a convex, concave, a combination of both a convex and concave, or a irregular surface.

Figure 6:
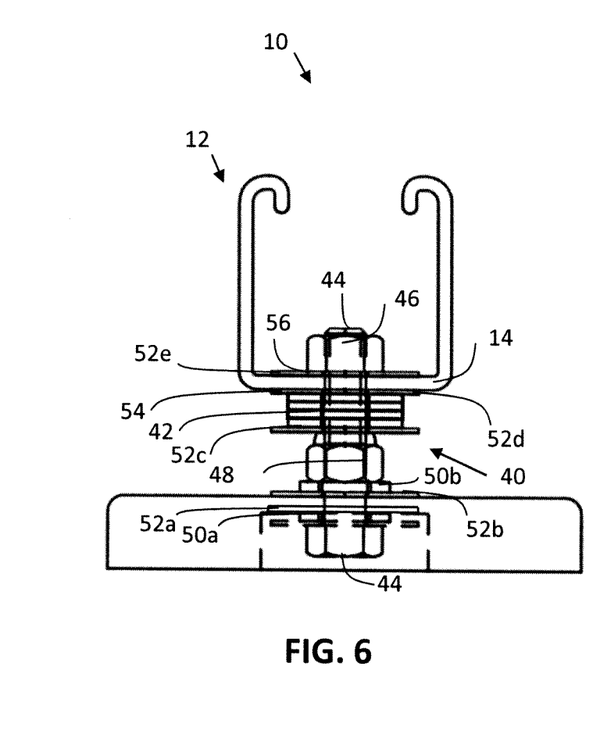
FIG. 6 is an enlarged side elevation view of a suspension assembly of the magnetic mounting system of FIG. 2 illustrating a magnetic in a first position in accordance with an embodiment of the present disclosure.
Figure 7:
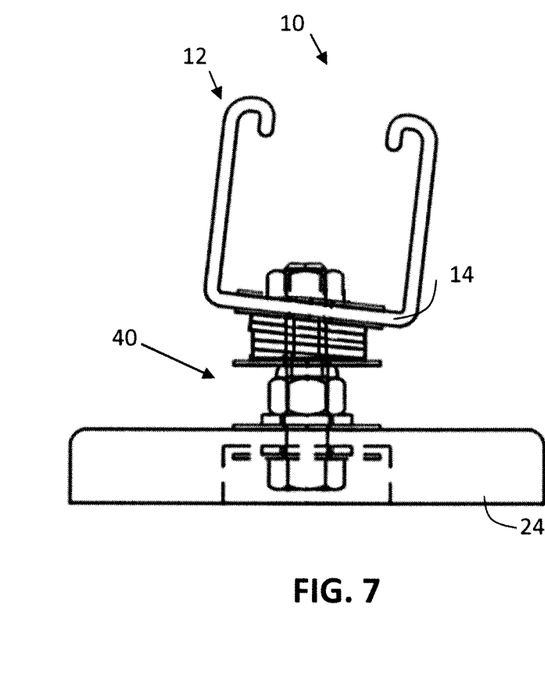
FIG. 7 is an enlarged side elevation view of a suspension assembly of the magnetic mounting system of FIG. 2 illustrating a magnetic in a second position in accordance with an embodiment of the present disclosure.

With reference now to FIGS. 6 and 7, the suspension assembly 40 may take a variety of configurations. As shown, the suspension assembly 40 includes at least one elastomeric member 42 disposed between the base 14 of the strut 12 and the magnet 24. The elastomeric member 42 allows the magnet to pivot relative to the base 14. Thus, the suspension assembly 40 provides for some movement of the magnet relative to the base 14 to facilitate in the connection of the magnet 24 to a variety of surfaces. The suspension assembly 40 generally includes a stainless steel bolt 44, one or more stainless steel locking nuts 46, one or more stainless steel nuts 48, one or more stainless steel locking washers or plates 50, and one or more stainless steel washers or plates 52.

With continued reference to FIG. 6, to mount the suspension assembly 40 to the base 14 of the strut 12 and the magnet 24, the magnet 24 can be first secured to the bolt 44. In this regard, a portion of the bolt 44 is extended through an opening (not shown) located on the magnet 24 with a pair of washers 52a, 52b positioned on the bolt 44 on opposing surfaces of the magnet 24. A pair of locking washers 50a, 50b, are also positioned on the bolt 44 on opposing ends of the magnet 24, each locking washer 50 engaging one of the washers 52. A nut 48 is threaded onto the bolt 44 to engage one of the locking washers, e.g. 50b, which fixedly secures the magnet 24 between the washers 52a, 52b. Washer 52c is positioned onto the bolt 44, washer 52c abutting nut 48. The elastomeric member 42, which can include a neoprene material such as at least one neoprene washer, is then mounted onto the bolt 44 followed by another washer 52d. It will also be appreciated that the elastomeric member may include other materials that allow the magnet 24 to pivot relative to the base 14. This subassembly is then secured to a first surface 54 of the base 14 of the strut 12. Specifically, a portion of the bolt 44 is extended through one of the mounting apertures 22 of the base 14. The mounting apertures 22 are generally larger than the outer diameter of the bolt 44 which allows the bolt 44 to shift or move in the aperture 22 as the magnet 24 pivots relative to the base 14 of the strut 12. Washer 52e is positioned onto the bolt 44 from a second surface 56 of the base 14 of the strut 12, the base 14 essentially being sandwiched between washers 52d and 52e. Locking nut 46 is then threaded onto the bolt and engages washer 52e.

It should be appreciated that the amount of movement of the magnet 24 relative to the base 14 of the strut 12 can also depend on the compression rate of the elastomeric member 42 which, in turn, can depend on the spacing between the base 14 and the magnet 24. As such, it will be understood that the farther the locking nut 46 is threaded onto the bolt 44, the more the elastomeric member 42 becomes compressed between washers 52c and 52d. As the elastomeric member 42 becomes compressed, the compression rate of the elastomeric member 42 will increase thereby limiting the pivotal movement of the magnet 24. Thus, the suspension assembly 40 allows the user of the magnetic mounting system 10 to control the pivotal movement of each magnet 24 depending on the type of surface to which the magnetic mounting system 10 is to be mounted.

FIGS. 6 and 7 illustrate a certain arrangement for the components of the suspension assembly 40 to moveably mount the elastomeric member 42 between the base 14 and the magnet 24; however, this arrangement is not limiting and may include a modified or different arrangement and more or fewer components. For example, the opening of the magnet 24 can have a diameter smaller than the locking nuts 46. In this embodiment, washers 52a and 52b may be eliminated. In addition the elastomeric member 42 can be bonded to one of the base 14, magnet 24 and washer 44. In this embodiment, the number of washers 50, 52 and I nuts 46, 48 may be reduced. It will be also appreciated that other and/or additional materials can be used for the suspension system. It will be appreciated that the bolts and other components can be varying dimensions and configurations to accommodate the installation of the magnetic mounting system 10 and various maintenance tasks on or around the vicinity of the mounting system 10 including painting, cleaning, repairing, or the like.

Figure 8:
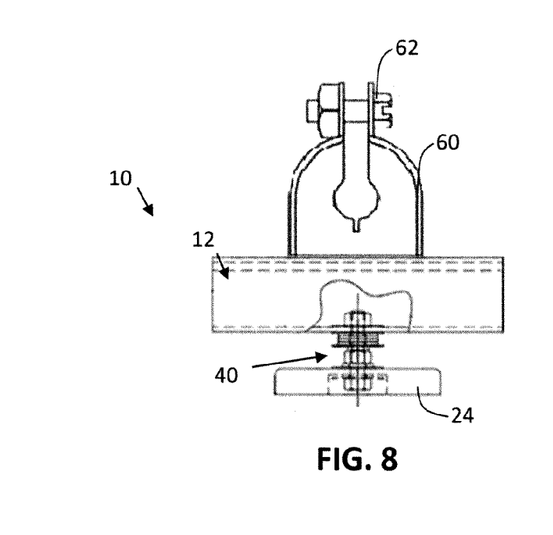
FIG. 8 is a side elevation view of a cable clamp mounted to the magnetic mounting system of FIG. 2 in accordance with an embodiment of the present disclosure.

FIG. 8 illustrates an example cable clamp 60 attached to the magnetic mounting system 10. The cable clamp may be commercially available, standardized, or the like and used for supporting runs of cables on various structures (e.g. water towers). In one example form, the cable clamp 60 is placed around the cable and integral fasteners 62 are tightened to securely fasten the cable to the cable clamp 60. It will be appreciated this arrangement is not limiting and may include a modified or different arrangement and more or fewer components. The cable clamp 60 is attached to the magnetic mounting system 10 to support the cable as it passes along the existing structure. In one example form, the cable clamp 60 generally includes a bolt (not shown), one or more locking nuts (not shown) and one or more square washers or plates (not shown), all of which in one form are stainless steel. The cable clamp 60 is first secured to the bolt. In this regard, a portion of the bolt is extended through an opening (not shown) located on the cable clamp 60. A pair of the square washers are slid onto the bolt from opposing surfaces of the cable clamp 60. A pair of the locking nuts are threaded onto the bolt from opposing ends of the bolt, each nut engaging one of the washers. The cable clamp 60 is then secured to the base of the strut 12. A portion of the bolt is extended through one of the mounting apertures of the base strut 12. A pair of washers are slid onto the bolt from opposing surfaces of the strut, the strut essentially being sandwiched between washers. A locking nut is then threaded onto the bolt and engages washer to securely attach the cable clamp 60 to the strut 12.

Figure 9:
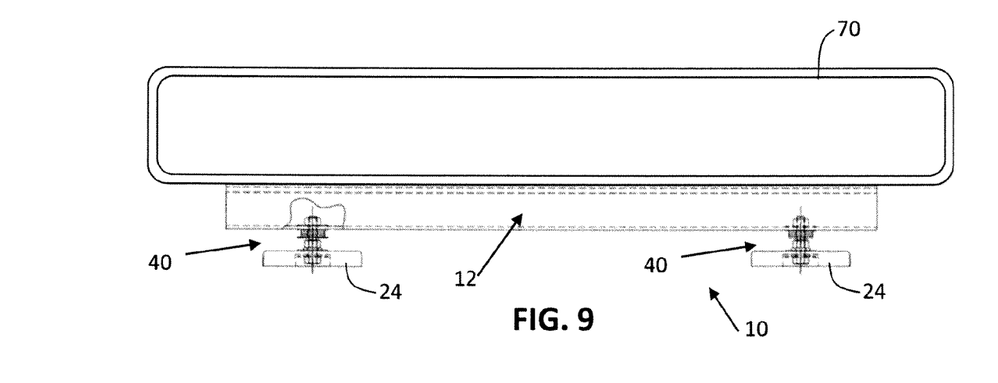
FIG. 9 is a side elevation view of a cable tray mounted to the magnetic mounting system of FIG. 2 in accordance with an embodiment of the present disclosure.
Figure 10:
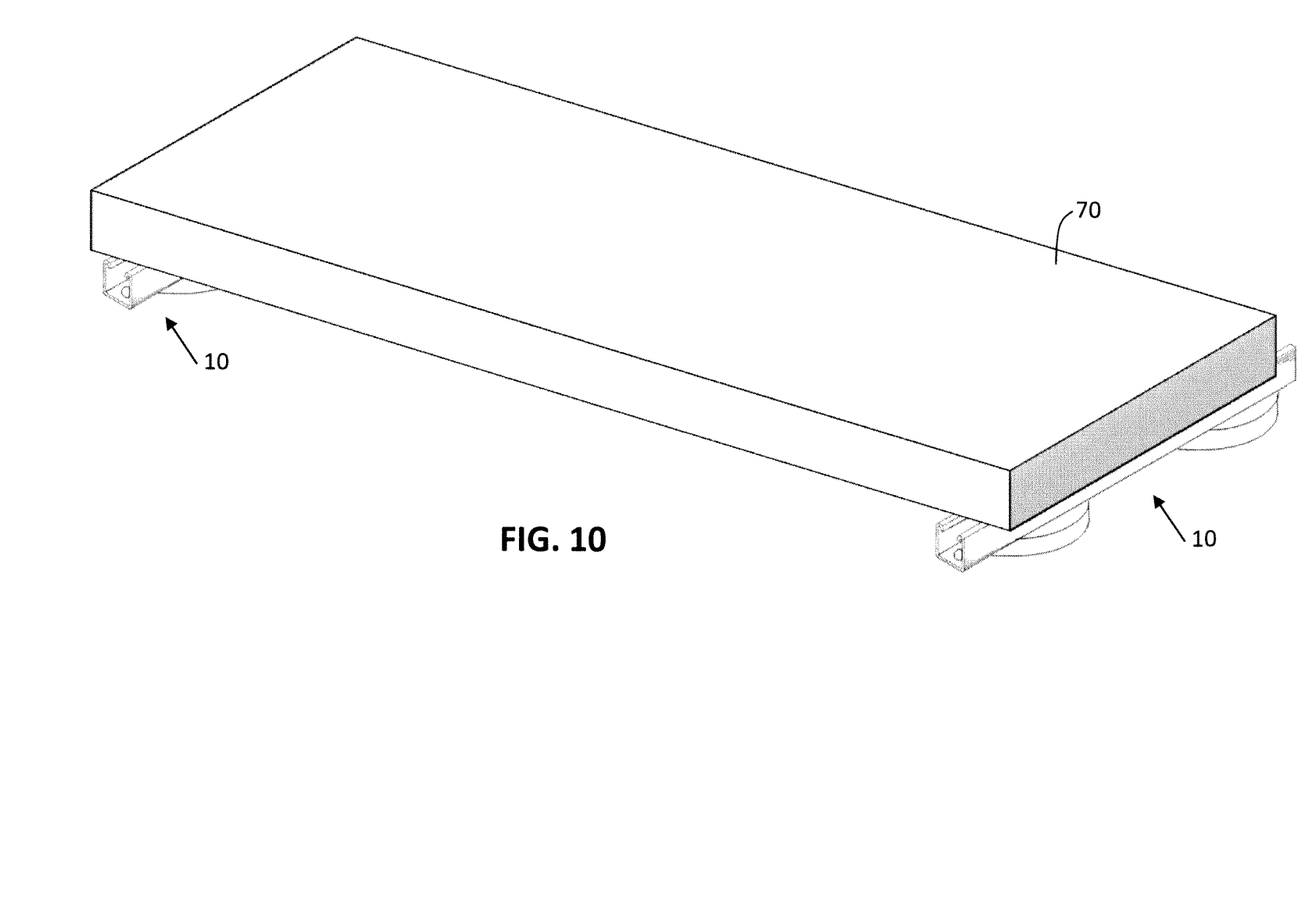
FIG. 10 is a front perspective view illustrating a cable tray mounted to the magnetic mounting system of FIG. 2 in accordance with an embodiment of the present disclosure.

FIG. 9 illustrates an example cable tray 70 attached to the magnetic mounting system 10. The cable tray 70 may be commercially available, standardized, or the like and used for supporting runs of cables on various structures (e.g. water towers). Electric power cables, communications cables, computer cables, signal cables, and the like are securely fastened or supported by the cable tray as they pass along the structure. Generally, cable trays comprise a recess or channel with a width sufficient to support or securely fasten a plurality of cables. The cable trays may be a solid bottom tray, a ventilated tray, a ladder type tray or the like. The cable tray 70 is attached to the magnetic mounting system 10 to support the cable as it passes along the existing structure. In one example form, the cable tray 70 generally includes a bolt (not shown), one or more locking nuts (not shown) and one or more square washers or plates (not shown), all of which in one form are stainless steel. It will be appreciated this arrangement is not limiting and may include a modified or different arrangement and more or fewer components. The cable tray 70 is first secured to the bolt. In this regard, a portion of a pair of bolts is extended through a pair of openings (not shown) located on the cable tray 70. A pair of the square washers are slid onto the bolts from opposing surfaces of the cable tray 70. A pair of the locking nuts are threaded onto the bolts from opposing ends of the bolts, each nut engaging one of the washers. The cable tray 70 is then secured to the base of the strut 12. A portion of the pair of bolts is extended through a pair of the mounting apertures of the base strut 12. A pair of washers are slid onto the bolts from opposing surfaces of the strut, the strut essentially being sandwiched between washers. A locking nut is then threaded onto the bolt and engages washer to securely attach the cable tray 70 to the strut 12. FIG. 10 illustrates two magnetic mounting systems 10 attached to the cable tray 12. It will be appreciated that the number of systems 10, the number of magnets 24, and their secured arrangements to the cable tray 70 will be dependent upon a particular application of the cable tray 70 and the type of surface onto which the magnetic mounting system 10 is to be mounted. As illustrated, the magnetic mounting system 10 is attached along the width or parallel to the opening of the cable tray 70, it is also contemplated that the magnetic mounting system is attached along the length or perpendicular to the opening of the cable tray 70.

FIGS. 8, 9, and 10 illustrate examples of configurations and arrangements of the magnetic mounting system including cable clamps and cable trays to securely fasten or support a cable as they pass along the structure. It will also be appreciated that the channel in the strut of the magnetic mounting system may also be utilized to fasten or supports cable.

While the present disclosure of a cable/cable tray mounting system is illustrated as being particularly applicable to the mounting of cable trays, cable clamps, and various types of support arrangements to various types of structures and/or surfaces, it should be appreciated that the present disclosure can be adapted for a wide variety of other types of equipment as well as a wide variety of other uses.

It should, of course, be understood that the description and drawings herein are merely illustrative and that various modifications and changes can be made in the structures disclosed without departing from the scope and spirit of the disclosure. Like numerals refer to like parts throughout the several views.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereto.

The invention claimed is:

1. A magnetic mounting system comprising:
   a strut;
   at least two magnets moveably suspended from the strut for mounting the strut onto a surface;
   suspension assemblies connected to the magnets for moveably securing the magnets to the strut, wherein the suspension assemblies include at least one elastomeric member disposed between each magnet and the strut; and,
   a cable tray secured to the strut to support runs of one or more cables.

2. A magnetic mounting system comprising:
   a strut;
   at least two magnets moveably suspended from the strut for mounting the strut onto a surface; and,
   a cable tray secured to the strut to support runs of one or more cables, wherein the cable tray includes a U-shaped recess with a width sufficient to support or securely fasten the one or more cables.

3. A magnetic mounting system comprising:
   a strut;
   at least two magnets moveably suspended from the strut for mounting the strut onto a surface; and,
   a cable tray secured to the strut to support runs of one or more cables, wherein the cable tray includes at least one bolt, one or more locking nuts, and one or more square washers.

4. A magnetic mounting system comprising:
   a strut including a plurality of spaced apart mounting apertures, the strut including a base connecting two spaced apart sides to define an elongated recess;
   a plurality of magnets suspended from the strut;
   a suspension assembly which pivotally secures the strut to each of the plurality of magnets;
   wherein the plurality of mounting apertures of the strut allow for varying magnetic arrangements of the plurality of magnets thereby allowing the mounting system to be mounted onto a convex surface; and,
   a cable tray secured to the strut to support runs of one or more cables, wherein the cable tray includes a U-shaped recess with a width sufficient to support or securely fasten the one or more cables.

5. The magnetic mounting system according to claim 1, wherein the suspension assemblies further includes at least one bolt, at least one locking nut and at least one washer.

6. The magnetic mounting system according to claim 1, wherein the strut includes a plurality of spaced apart mounting apertures.

7. The magnetic mounting system according to claim 6, wherein each aperture of the strut is configured to receive a portion of a suspension assembly to suspend the magnets from the strut.

8. The magnetic mounting system according to claim 1, wherein the strut includes a base connecting two spaced apart sides to define an elongated recess.

9. The magnetic mounting system according to claim 2, further comprising suspension assemblies, for moveably suspending the magnets to the strut, including at least one bolt, at least one locking nut and at least one washer.

10. The magnetic mounting system according to claim 2, further comprising suspension assemblies, for moveably suspending the magnets to the strut, including at least one elastomeric member.

11. The magnetic mounting system according to claim 2, wherein the strut includes a plurality of spaced apart mounting apertures.

12. The magnetic mounting system according to claim 11, wherein each aperture of the strut is configured to receive a portion of a suspension assembly to suspend a magnet from the strut.

13. The magnetic mounting system according to claim 2, wherein the strut includes a base connecting two spaced apart sides to define an elongated recess.

14. The magnetic mounting system according to claim 3, further comprising suspension assemblies, for moveably suspending the magnets to the strut, including at least one bolt, at least one locking nut and at least one washer.

15. The magnetic mounting system according to claim 3, further comprising suspension assemblies, for moveably suspending the magnets to the strut, including at least one elastomeric member.

16. The magnetic mounting system according to claim 3, wherein the strut includes a plurality of spaced apart mounting apertures.

17. The magnetic mounting system according to claim 16, wherein each aperture of the strut is configured to receive a portion of a suspension assembly to suspend a magnet from the strut.

18. The magnetic mounting system according to claim 3, wherein the strut includes a base connecting two spaced apart sides to define an elongated recess.

19. The magnetic mounting system according to claim 4, wherein suspension assemblies include at least one bolt, at least one locking nut and at least one washer.

20. The magnetic mounting system according to claim 4, wherein suspension assemblies include at least one elastomeric member.

21. The magnetic mounting system according to claim 4, wherein each aperture of the strut is configured to receive a portion of the suspension assembly to suspend a magnet from the strut.

* * * * *